United States Patent
Ono et al.

(10) Patent No.: US 9,627,148 B2
(45) Date of Patent: Apr. 18, 2017

(54) ALL-SOLID-STATE CAPACITOR

(71) Applicant: KYOCERA Corporation, Kyoto-shi, Kyoto (JP)

(72) Inventors: Tomoyuki Ono, Kirishima (JP); Seiichirou Hirahara, Kirishima (JP); Takashi Oto, Hirakata (JP); Youji Seki, Kagoshima (JP); Maiko Nagayoshi, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 10 days.

(21) Appl. No.: 14/773,437

(22) PCT Filed: Mar. 3, 2014

(86) PCT No.: PCT/JP2014/055312
§ 371 (c)(1),
(2) Date: Sep. 8, 2015

(87) PCT Pub. No.: WO2014/148234
PCT Pub. Date: Sep. 25, 2014

(65) Prior Publication Data
US 2016/0020037 A1 Jan. 21, 2016

(30) Foreign Application Priority Data
Mar. 18, 2013 (JP) .................. 2013-055765

(51) Int. Cl.
*H01G 9/15* (2006.01)
*H01G 11/56* (2013.01)
*H01G 4/08* (2006.01)

(52) U.S. Cl.
CPC ............... *H01G 9/15* (2013.01); *H01G 4/08* (2013.01); *H01G 11/56* (2013.01); *Y02E 60/13* (2013.01)

(58) Field of Classification Search
None
See application file for complete search history.

(56) References Cited

U.S. PATENT DOCUMENTS 7,981,464 B2  7/2011  Yadav et al.
2008/0117563 A1  5/2008  Nagata et al.
(Continued)

FOREIGN PATENT DOCUMENTS

| JP | 2008-130844 A | 6/2008 |
| JP | 2012-138502 A | 7/2012 |
| JP | 5046700 B2 | 10/2012 |

OTHER PUBLICATIONS

International Search Report, PCT/JP2014/055312, May 20, 2014, 1 pg.
(Continued)

*Primary Examiner* — Dion R Ferguson
(74) *Attorney, Agent, or Firm* — Volpe and Koenig, P.C.

(57) ABSTRACT

An all-solid-state capacitor includes an inorganic solid electrolyte; and a pair of current collectors disposed so as to hold it in between. The inorganic solid electrolyte has a polycrystalline structure, and the all-solid-state capacitor satisfies a relationship given as: R1<R2<R3, a relationship given as: C1<C3, and a relationship given as: C1<C2 in which, R1, R2 and R3 are resistance components, and R1 denotes an intragrain resistance of the inorganic solid electrolyte, R2 denotes a grain-boundary resistance of the inorganic solid electrolyte and R3 denotes an interfacial resistance between the inorganic solid electrolyte and the current collector, and, C1, C2 and C3 are capacitance components, and C1 denotes an intragrain capacity of the inorganic solid electrolyte, C2 denotes a grain-boundary capacity of the inorganic solid electrolyte and C3 denotes an interfacial capacity between the inorganic solid electrolyte and the current collector.

6 Claims, 4 Drawing Sheets

(56) References Cited

U.S. PATENT DOCUMENTS

| | | |
|---|---|---|
| 2010/0014214 A1 | 1/2010 | Yamazaki et al. |
| 2010/0203383 A1 | 8/2010 | Weppner |
| 2012/0162854 A1 | 6/2012 | Iwanaga |
| 2016/0233032 A1* | 8/2016 | Ono .................. H01G 11/56 |
| 2016/0247635 A1* | 8/2016 | Hirahara ............. H01G 4/12 |

OTHER PUBLICATIONS

Bohnke, O., et al., Anomalies in Li+ ion dynamics observed by impedance spectroscopy and 7Li NMR in the oerovskite fast ion conductor (Li3xLa2/3-x@1/3-2x) Ti03, Solid State Ionics, North Holland Pub. Company, Amsterdam; NL, NL, vol. 158, No. 1-2, Feb. 1, 2003 (Feb. 1, 2003), pp. 119-132.

Bohnke, O., et al., "The fast lithium-ion conducting oxides Li3xLa2/3-xTi03 from fundamentals to application," Solid State Ionics, North Holland Pub. Company, Amsterdam; NL, NL, vol. 179, No. 1-6, Jan. 24, 2008 (Jan. 24, 2008), pp. 9-15.

Extended European Search Report, European Patent Application No. 14768712.3, Sep. 7, 2016, 13 pgs.

* cited by examiner

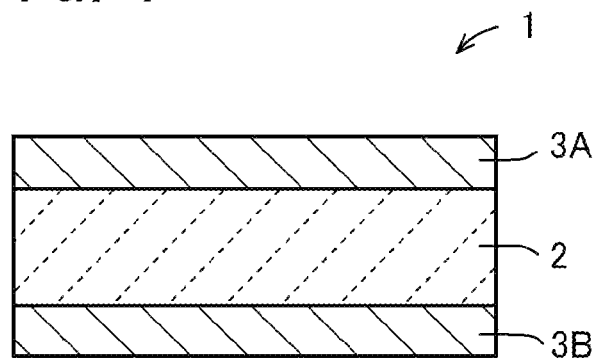
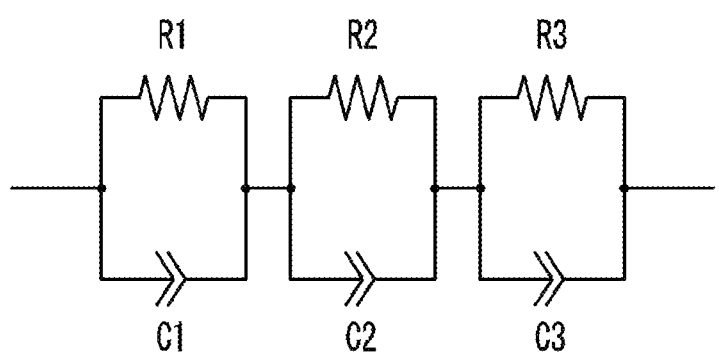

ALL-SOLID-STATE CAPACITOR

TECHNICAL FIELD

The present invention relates to an all-solid-state capacitor that utilizes an inorganic solid electrolyte having a polycrystalline structure as an electrolyte.

BACKGROUND ART

Higher level of sophistication and downsizing are demanded in various electronic equipment, including information equipment, communications equipment, and household electrical appliances, and this trend has created a need for each electronic component mounted in electronic equipment to be adapted for the sophistication and downsizing. One of electronic components that are mounted in electronic equipment is a capacitor. A capacitance is a performance characteristic demanded in a capacitor, and thus both a high capacitance and reduction in general size need to be achieved in a capacitor.

Multilayer ceramic capacitors described in Patent Literatures 1 and 2 utilize barium titanate as a dielectric to attain a high relative permittivity of a dielectric for an increase in capacitance.

In Patent Literature 3, there is described an all-solid-state electric double-layer capacitor. An electric double-layer capacitor is intended to attain a high capacitance by utilizing an electric double layer formed at the interface between an electrolyte and a current collector. Moreover, an all-solid-state capacitor does not use a liquid as an electrolyte, and is thus free from liquid leakage which may occur in an aluminum electrolytic capacitor and an electric double-layer capacitor using activated carbon.

CITATION LIST

Patent Literature

Patent Literature 1: Japanese Examined Patent Publication JP-B2 5046700

Patent Literature 2: Japanese Unexamined Patent Publication JP-A 2012-138502

Patent Literature 3: Japanese Unexamined Patent Publication JP-A 2008-130844

SUMMARY OF INVENTION

Technical Problem

Barium titanate has a relative permittivity in the order of about a few thousand to ten thousand. Thus, the multilayer ceramic capacitors described in Patent Literatures 1 and 2 are not capable of achieving both attainment of a high capacitance and downsizing. Furthermore, in the electric double-layer capacitor described in Patent Literature 3, a capacitance varies greatly according to the frequency of a voltage to be applied. Especially in a range of frequencies as low as a few kHz, a capacitance drops sharply as the frequency increases, thus causing difficulty in attaining stable characteristics.

An object of the invention is to provide an all-solid-state capacitor having high capacitance characteristics and low frequency dependence of capacitance in a low-frequency range.

Solution to Problem

The invention provides an all-solid-state capacitor including:

an inorganic solid electrolyte; and
a pair of current collectors disposed so as to hold the inorganic solid electrolyte in between,
the inorganic solid electrolyte having a polycrystalline structure,
the all-solid-state capacitor satisfying a relationship given as: $R1<R2<R3$, a relationship given as: $C1<C3$, and a relationship given as: $C1<C2$,
in which, R1, R2 and R3 are resistance components, and R1 denotes an intragrain resistance of the inorganic solid electrolyte, R2 denotes a grain-boundary resistance of the inorganic solid electrolyte and R3 denotes an interfacial resistance between the inorganic solid electrolyte and the current collector, and,
C1, C2 and C3 are capacitance components, and C1 denotes an intragrain capacity of the inorganic solid electrolyte, C2 denotes a grain-boundary capacity of the inorganic solid electrolyte and C3 denotes an interfacial capacity between the inorganic solid electrolyte and the current collector.

Advantageous Effects of Invention

According to the invention, there is provided an all-solid-state capacitor having high capacitance characteristics and low frequency dependence of capacitance in a low-frequency range.

BRIEF DESCRIPTION OF DRAWINGS

Other and further objects, features, and advantages of the invention will be more explicit from the following detailed description taken with reference to the drawings wherein:

FIG. 1 is a sectional view schematically showing the structure of an all-solid-state capacitor 1 in accordance with an embodiment of the invention;

FIG. 2 is a schematic equivalent circuit diagram used for impedance analysis;

DESCRIPTION OF EMBODIMENTS

Figure 3:
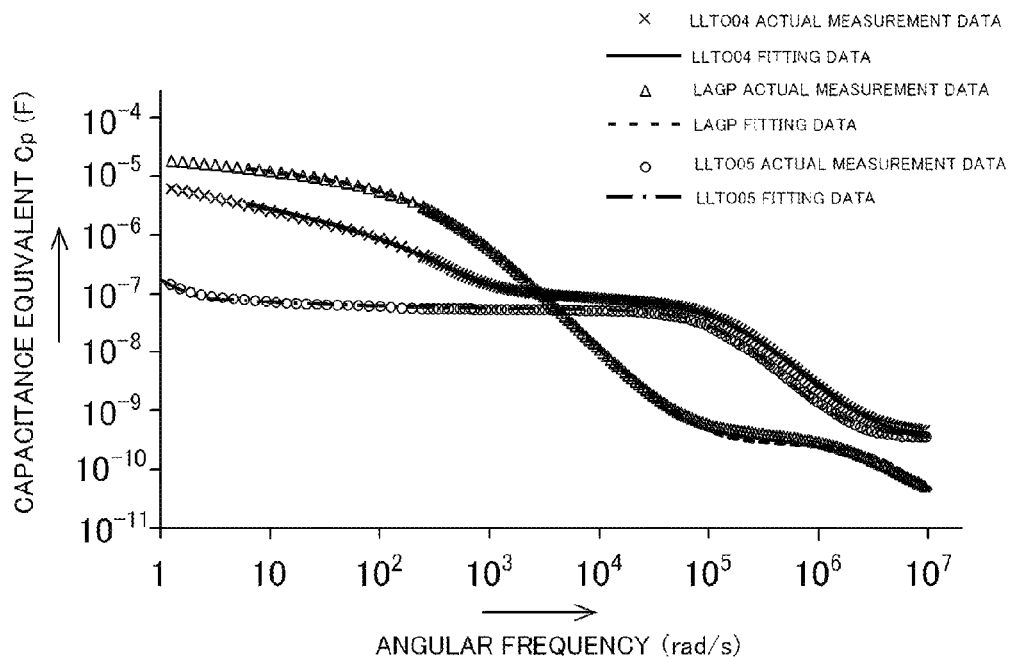
FIG. 3 is a graph indicating actual measurement data on LLTO04, LLTO05, and LAGP, and fitting curves obtained by analysis using the equivalent circuit.

FIG. 1 is a sectional view schematically showing the structure of an all-solid-state capacitor 1 in accordance with an embodiment of the invention. The all-solid-state capacitor 1 of this embodiment is preferably given the form of an electric double-layer capacitor which utilizes an electric double layer, and, the electric double-layer capacitor (hereafter also referred to simply as "capacitor") 1 comprises an inorganic solid electrolyte 2 and a pair of current collectors 3A and 3B disposed so as to hold the inorganic solid electrolyte 2 in between. The current collectors 3A and 3B are made of a metal material composed predominantly of at least one of the substances selected from among Au, Ag, and Cu, for example.

The inorganic solid electrolyte 2 has a polycrystalline structure in which alkali-metal ions such as Li ions move within crystal grains. The movement of the alkali-metal ions allows formation of an electric double layer at the interface between the current collector 3A, 3B and the inorganic solid electrolyte 2, as well as at crystal grain boundaries, and also allows superposition of dielectric's capacitance under ionic polarization, interfacial polarization, or orientational polarization in crystal grains or at crystal grain boundaries, thus affording a high capacitance.

In the electric double-layer capacitor 1, given that, R1, R2 and R3 are electrical resistance components, and R1 denotes a resistance within crystal grains of the inorganic solid electrolyte 2, R2 denotes a resistance at crystal grain boundaries of the inorganic solid electrolyte 2 and R3 denotes a resistance at the interface between the inorganic solid electrolyte 2 and the current collector 3A, 3B, and, C1, C2 and C3 are capacitance components, are C1 denotes a capacity within crystal grains of the inorganic solid electrolyte 2, C2 denotes a capacity at crystal grain boundaries of the inorganic solid electrolyte 2 and C3 denotes a capacity at the interface between the inorganic solid electrolyte 2 and the current collector 3A, 3B, it is preferable that R1, R2, R3, C1, C2, and C3 satisfy the following relationships:

$$R1<R2<R3 \qquad \text{Formula 1;}$$

$$C1<C3 \qquad \text{Formula 2; and}$$

$$C1<C2 \qquad \text{Formula 3.}$$

The satisfaction of the Formula 1 makes it possible to define an interfacial capacity developed in the lowest range of frequencies of voltage applied to the electric double-layer capacitor 1 (hereafter also referred to simply as "applied voltage") as a capacity of the electric double-layer capacitor 1, as well as to allow the electric double-layer capacitor 1 to exhibit high insulation performance as a capacitor, and also exhibit high power storage capability as a power storage device. Moreover, the resistance at crystal grain boundaries (hereafter also referred to simply as "grain-boundary resistance") is lower than the interfacial resistance, and the resistance within crystal grains (hereafter also referred to simply as "intragrain resistance") is low relative to the grain-boundary resistance. This brings about the effect of reducing heat generation during the use of the electric double-layer capacitor 1 serving as a capacitor or a power storage device. The intragrain resistance, in particular, involves heat generation caused by ion current within the inorganic solid electrolyte 2, and it is thus preferable that the intragrain resistance is the lowest among the resistance components.

Moreover, the higher the frequency of applied voltage is, the smaller the resistance components are, which characterizes an influence exerted upon the capacitance of the electric double-layer capacitor 1. That is, given that the relationship given as: R1<R2<R3 holds, then the interfacial capacity is dominant in a range of low frequencies of applied voltage, but, as the frequency increases, the capacity at crystal grain boundaries (hereafter also referred to simply as "grain-boundary capacity") and the capacity within crystal grains (hereafter also referred to simply as "intragrain capacity") sequentially exert influences in the order named as series capacitance against the interfacial capacity. Thus, a new capacity component which appears as the frequency of the applied voltage increases is a relatively low capacity, wherefore the capacitance of the electric double-layer capacitor 1 drops sharply, signifying frequency dependence.

In this regard, the satisfaction of Formula 3 makes it possible to cause the grain-boundary capacity involving a relatively high capacitance to appear next to the interfacial capacity with increasing frequency, and thereby avoid a sharp decrease in the capacitance in the capacitor. Moreover, the satisfaction of Formulae 2 and 3 makes it possible to keep high the capacitance of the electric double-layer capacitor 1 based on the interfacial capacity and the grain-boundary capacity developed in a relatively low frequency range. In addition, by keeping the intragrain capacity which appears at the highest frequency at a minimum, it is possible to cause frequencies at which the capacitance of the electric double-layer capacitor 1 falls to its lowest level to lie in a higher frequency range.

Examples of the inorganic solid electrolyte 2 that satisfies Formulae 1 to 3 include: $M1_{(2-x)/3} M2_xM3O_3$ having a perovskite crystal structure (wherein M1 represents a rare-earth element, M2 represents an alkali-metal element, and M3 represents a tetravalent metal element, and, a relationship given as: $0<x\leq0.5$ is satisfied); $Li_\alpha Al_xTi_{2-x}(PO_4)_\beta$ having a NaSICON crystal structure, which will hereafter be referred to as "LATP" (wherein relationships given as: $0\leq x\leq0.6$; $\alpha\geq1+x$; and $3.0\leq\beta\leq3.6$ are satisfied); $Li_{\alpha(1+x)}Al_xGe_{2-x}(PO_4)_\beta$, which will hereafter be referred to as "LAGP" (wherein relationships given as: $0.4\leq x\leq0.7$; $1.0\leq\alpha\leq1.2$; and $3.0\leq\beta\leq3.6$ are satisfied); $Li_xA_y(B1_{z1}B2_{z2})O_t$ having a garnet crystal structure (wherein A represents an alkaline-earth metal element or a rare-earth element, B1 and B2 represent different metal elements that are each one selected from among elements belonging to Group 3, Group 4, Group 13, and Group 14 in the periodic table, and, relationships given as: $5.5<x<8.0$; $2.7<y<3.3$; $Z1>0$; $Z2\leq0$; $1.8<Z1+Z2<2.4$; $10<t<14$ are satisfied); and the aforementioned element containing a predetermined amount of an additive such as a sintering aid.

<Analysis 1>

As exemplary of the inorganic solid electrolyte 2, $La_{(2-x)/3}Li_xTiO_3$, which will hereafter be referred to as "LLTO", in which x=0.50 (hereafter referred to as "LLTO01"), LLTO in which x=0.42 (hereafter referred to as "LLTO04"), and LLTO05 which is obtained by adding BaO to LLTO04, and also LAGP (wherein x equals 0.5, α equals 1.0, and β equals 3.0) have been subjected to analysis work to check the dependence of a capacitance on the frequency of applied voltage.

Impedance analysis has been conducted by an equivalent circuit on the basis of the results of impedance measurement on the electric double-layer capacitor 1 employing such an inorganic solid electrolyte 2. Details of a method for manufacturing the electric double-layer capacitor 1 and a measurement method will be given later on.

FIG. 2 is a schematic equivalent circuit diagram used for impedance analysis. As shown in FIG. 2, an equivalent circuit in use is a parallel circuit including resistance components and capacity components present within crystal grains of the inorganic solid electrolyte 2; at crystal grain boundaries of the inorganic solid electrolyte 2; and at the interface between the inorganic solid electrolyte 2 and the current collector 3A, 3B. A list of the values of R1, R2, R3, C1, C2, and C3 obtained by calculation in impedance analysis is given in Table 1. In the invention, resistance is expressed in the unit Ω, and capacity is expressed in the unit F unless otherwise specified. Although an impedance of each capacity component in an equivalent circuit is generally expressed as $1/j\omega C$, in this case, an equivalent circuit model in which an impedance is expressed as $1/\{(j\cdot\omega)^P\cdot C\}$ was used for impedance analysis. Also presented in Table 1 are P3, P2, and P1 that denote the power of an angular frequency corresponding to the interfacial capacity, the same corresponding to the grain-boundary capacity, and the same corresponding to the intragrain capacity, respectively.

TABLE 1

|  | LLTO04 | LLTO05 | LAGP |
| --- | --- | --- | --- |
| R1 | 79 | 141 | 335 |
| C1 | $3.1 \times 10^{-10}$ | $3.6 \times 10^{-9}$ | $1.7 \times 10^{-11}$ |
| P1 | 1 | 0.9 | 1 |
| R2 | $2.6 \times 10^{3}$ | $1.5 \times 10^{6}$ | $1.7 \times 10^{2}$ |
| C2 | $2.3 \times 10^{-7}$ | $7.4 \times 10^{-8}$ | $2.3 \times 10^{-9}$ |
| P2 | 1 | 1 | 1 |
| R3 | $1.0 \times 10^{20}$ | $2.3 \times 10^{6}$ | $1.0 \times 10^{20}$ |
| C3 | $7.9 \times 10^{-6}$ | $2.6 \times 10^{-5}$ | $2.1 \times 10^{-5}$ |
| P3 | 0.65 | 0.8 | 0.80 |

FIG. 3 is a graph indicating actual measurement data on LLTO04, LLTO05, and LAGP, and fitting curves obtained by analysis using the equivalent circuit. The abscissa represents angular frequency (rad/s) which equals $2\pi$ multiplied by normal frequency, and the ordinate represents capacitance equivalent Cp (F). In the graph, actual measurement data on LLTO04, LLTO05, and LAGP and curves fitted for the values of R1, R2, R3, C1, C2, and C3 presented in Table 1 are superimposed. As will be understood from the graph, the actual measurement data and the fitting curves generally conform to each other.

The values of R1, R2, R3, C1, C2, and C3 presented in Table 1, (these values, together with the values of P1, P2, and P3, will hereafter be collectively called "circuitry parameters") satisfy the relationships defined by Formulae 1, 2, and 3. It will thus be seen that, as the frequency increases, the interfacial capacity C3, the grain-boundary capacity C2, and the intragrain capacity C1 are developed as the capacitance of the electric double-layer capacitor 1.

In the inorganic solid electrolyte 2, it is preferable that a value A which is expressed by the following formula (A) falls in the range of 0.1 to 100 rad/s:

$$A=1/\{R2\cdot(C2\cdot C3)^{1/2}\} \quad (A),$$

in which R2 denotes the grain-boundary resistance, C2 denotes the grain-boundary capacity, and C3 denotes the interfacial capacity.

The value A is an approximate measure of a frequency at which the capacitance of the capacitor drops most rapidly due to the development of the grain-boundary resistance R2. In the case where the value A falls in the range of 0.1 to 100 rad/s, angular frequencies at which the capacitance drops sharply due to the development of the grain-boundary resistance R2 can range downwardly from the level of 0.1 to 100 rad/s. In consequence, at angular frequencies of applied voltage ranging upwardly from the level of 0.1 to 100 rad/s, a stable capacitance based on a composite of the interfacial capacity C3 and the grain-boundary capacity C2 can be developed as the capacitance of the capacitor, thus reducing the dependence of the capacitance of the electric double-layer capacitor 1 on frequency.

Moreover, it is preferable that a value B which is expressed by the following formula (B) falls in the range of 0.1 to 100 rad/s:

$$B=1/(R2\cdot C2) \quad (B),$$

in which R2 denotes the grain-boundary resistance and C2 denotes the grain-boundary capacity.

The value B is an approximate measure of a frequency at which there occurs a transition from a state where the capacitance of the capacitor decreases due to the development of the grain-boundary resistance R2 to a state where a stable capacitance based on a composite of the interfacial capacity C3 and the grain-boundary capacity C2 can be developed. In the case where the value B falls in the range of 0.1 to 100 rad/s, angular frequencies, at which a sharp decrease of the capacitance that is caused by the development of the grain-boundary resistance R2 can be reduced by the development of a stable capacitance based on a composite of the interfacial capacity C3 and the grain-boundary capacity C2, can range downwardly from the level of 0.1 to 100 rad/s. In consequence, at angular frequencies of applied voltage ranging upwardly from the level of 0.1 to 100 rad/s, a stable capacitance based on a composite of the interfacial capacity C3 and the grain-boundary capacity C2 can be developed as the capacitance of the capacitor 1, thus reducing the dependence of the capacitance of the electric double-layer capacitor 1 on frequency.

<Analysis 2> when in LLTO01, the value A and the value B are calculated on the basis of the circuitry parameters in the manufactured electric double-layer capacitor 1, the value A is 428 rad/s, and the value B is 2959 rad/s. In running a simulation, the grain-boundary capacity C2 and the grain-boundary resistance R2 were changed to set the value A and the value B at 4 rad/s and 9 rad/s, respectively.

Figure 4:
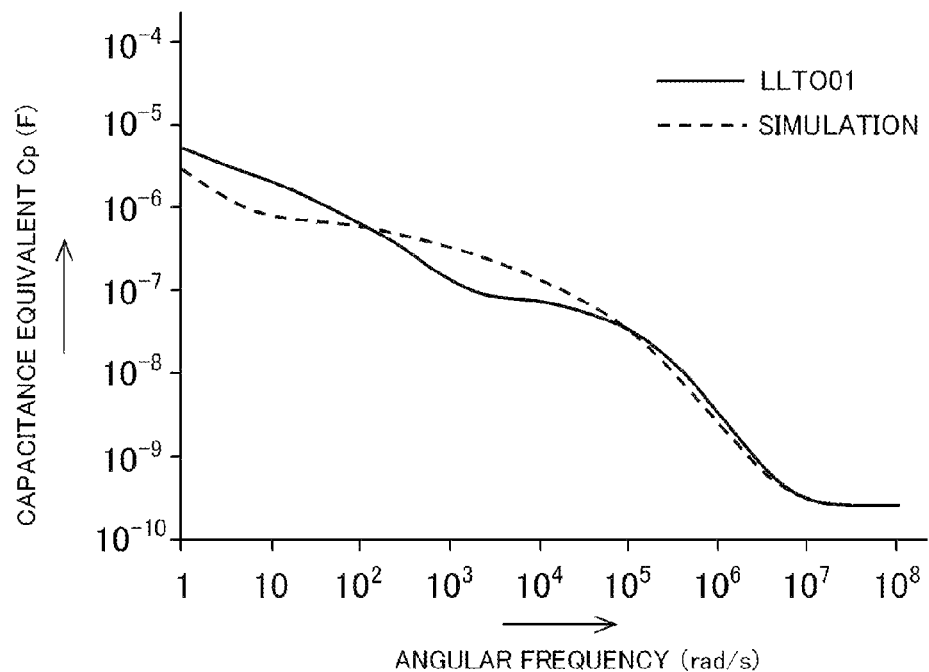
FIG. 4 is a graph indicating the result of actual measurement for the case of A=428 and B=2959, and the result of the simulation for the case of A=4 and B=9.

FIG. 4 is a graph indicating the result of actual measurement for the case of A=428 rad/s and B=2959 rad/s, and the result of the simulation for the case of A=4 rad/s and B=9 rad/s. The indications of the abscissa and the ordinate of FIG. 4 are identical with those shown in FIG. 3. Moreover, circuitry parameters adopted in Analysis 2 are presented in Table 2.

TABLE 2

|  | LLTO01 | Simulation |
| --- | --- | --- |
| R1 | 82 | 82 |
| C1 | $2.6 \times 10^{-10}$ | $2.6 \times 10^{-10}$ |
| P1 | 1 | 1 |
| R2 | $2.6 \times 10^{3}$ | $8.6 \times 10^{4}$ |
| C2 | $1.3 \times 10^{-7}$ | $1.3 \times 10^{-6}$ |
| P2 | 1 | 1 |
| R3 | $2.2 \times 10^{19}$ | $2.2 \times 10^{19}$ |
| C3 | $6.2 \times 10^{-6}$ | $6.2 \times 10^{-6}$ |
| P3 | 0.63 | 0.63 |

The same equivalent circuit as that used in the impedance analysis in Analysis 1 was used in the simulation. According to the result of the simulation, in the case of A=4 rad/s and B=9 rad/s, as contrasted to actual measurement data on LLTO01 of A=428 rad/s and B=2959 rad/s, it has been confirmed that the capacitor can be restrained against an appreciable decrease in capacitance at angular frequencies in the range of 1 to 10000 rad/s. Moreover, further reduction of the values A and B helps lessen the dependence of the capacitance of the capacitor on frequency even at angular frequencies ranging downwardly from 1 rad/s.

Such a frequency characteristic can be imparted to the capacitance of the capacitor simply by increasing the grain-boundary resistance R2 or the grain-boundary capacity C2, more specifically, by attaining a polycrystalline structure that is obtained by, for example, reducing amorphous components at the grain boundary phase of LLTO to increase crystallinity for enhancement in insulation at grain boundaries, or reducing the thickness of an insulating grain-boundary layer to increase the capacity at grain boundaries.

For example, such a grain boundary phase can be attained by using an existing technique of designing a sintering aid and a trace additive in conformity with a principal crystalline phase to increase crystallinity of a grain boundary phase of crystallized glass ceramics, or make the grain boundary phase very thin by using a dielectric material, a piezoelectric material, or the like.

Moreover, in the inorganic solid electrolyte 2, the ratio C2/C3 of the grain-boundary capacity C2 to the interfacial capacity C3 is preferably greater than or equal to 0.8. By approximating the value of the grain-boundary capacity C2 to the value of the interfacial capacity C3, or adjusting the value of the grain-boundary capacity C2 to be greater than or equal to the value of the interfacial capacity C3, it is possible to reduce the dependence of the capacitance of the capacitor 1 on frequency. For example, in LLTO04 under Analysis 1, angular frequencies ranging downwardly from 10 rad/s correspond to a capacitance defined solely by the interfacial capacity C3; angular frequencies in the range of 10 to 10000 rad/s correspond to a capacitance in which the interfacial capacity C3 and the grain-boundary capacity C2 are series-combined; and angular frequencies ranging upwardly from 10000 rad/s correspond to a capacitance in which the interfacial capacity C3, the grain-boundary capacity C2, and the intragrain capacity C1 are series-combined. By approximating the value of the grain-boundary capacity C2 to the value of the interfacial capacity C3 to reduce the difference between the interfacial capacity C3 and the grain-boundary capacity C2, it is possible to approximate the capacitance of the capacitor 1 to the interfacial capacity C3 in the range of 10 to 10000 rad/s in which the interfacial capacity C3 and the grain-boundary capacity C2 are dominant, and thereby greatly reduce the dependence of the capacitance of the electric double-layer capacitor 1 on frequency at angular frequencies ranging downwardly from 10000 rad/s.

<Analysis 3>

In running a simulation with LLTO04, the grain-boundary capacity C2 and the interfacial capacity C3 were set at the same value, and, comparison was made between the result of the simulation and actual measurement data. The same equivalent circuit as that used in the impedance analysis in Analysis 1 was used in the simulation.

Figure 5:
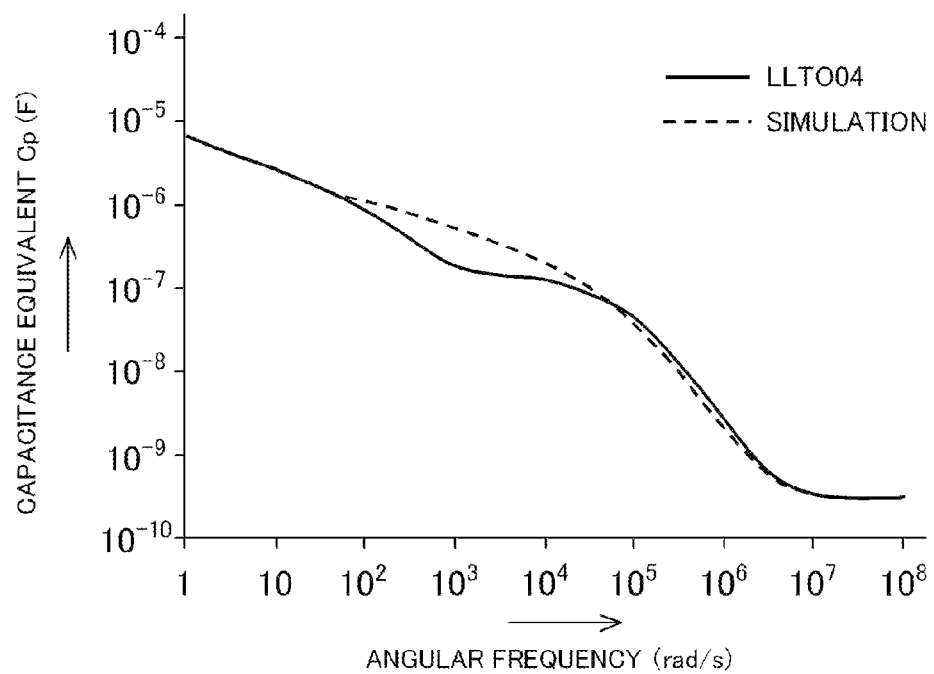
FIG. 5 is a graph indicating the result of actual measurement on LLTO04 and the result of the simulation for the case where the grain-boundary capacity C2 and the interfacial capacity C3 stand at the same value.

FIG. 5 is a graph indicating the result of actual measurement on LLTO04 and the result of the simulation for the case where the grain-boundary capacity C2 and the interfacial capacity C3 stand at the same value. The indications of the abscissa and the ordinate of FIG. 5 are identical with those shown in FIG. 3. Moreover, circuitry parameters adopted in Analysis 3 are presented in Table 3.

TABLE 3

|  | LLTO04 | Simulation |
| --- | --- | --- |
| R1 | 79 | 79 |
| C1 | $3.1 \times 10^{-10}$ | $3.1 \times 10^{-10}$ |
| P1 | 1 | 1 |
| R2 | $2.6 \times 10^{3}$ | $2.6 \times 10^{3}$ |
| C2 | $2.3 \times 10^{-7}$ | $7.9 \times 10^{-6}$ |
| P2 | 1 | 1 |
| R3 | $1.0 \times 10^{20}$ | $1.0 \times 10^{20}$ |
| C3 | $7.9 \times 10^{-6}$ | $7.9 \times 10^{-6}$ |
| P3 | 0.65 | 0.65 |

As will be understood from the graph, the dependence of the capacitance of the capacitor 1 on frequency is analogous to the dependence of the capacitance of the interfacial capacity C3 on frequency at angular frequencies ranging up to 10000 rad/s, and it is thus possible to reduce a sharp decrease of the capacitance of the capacitor 1 in the range of 10 to 100 rad/s with the development of the grain-boundary capacity C2.

The grain-boundary capacity C2 can be increased by raising the capacity of an electric double layer produced at grain boundaries. This is achieved by, for example, attaining a fine structure with thinner grain boundary layers. For example, selection of a material composition is made in accordance with an existing technique of designing a sintering aid and a trace additive in conformity with a principal crystalline phase, which is used with a dielectric material or a piezoelectric material having very thin grain boundary layers.

Moreover, it is particularly desirable that the intragrain resistance R1 and the grain-boundary capacity C2 satisfy the following formula (C):

$$1/(R1 \cdot C2) \geq 10000 \text{ rad/s} \qquad (C).$$

In this case, an angular frequency at which the effect of the intragrain capacity C1 becomes prominent can be set to be greater than or equal to 10000 rad/s, wherefore the capacitance of the electric double-layer capacitor 1 at angular frequencies ranging downwardly from 10000 rad/s can be laid to the grain-boundary capacity C2 and thus become less dependent on frequency.

<Analysis 4>

In running a simulation with LLTO04, the value of the intragrain resistance R1 was reduced, and, comparison was made between the result of the simulation and actual measurement data.

Figure 6:
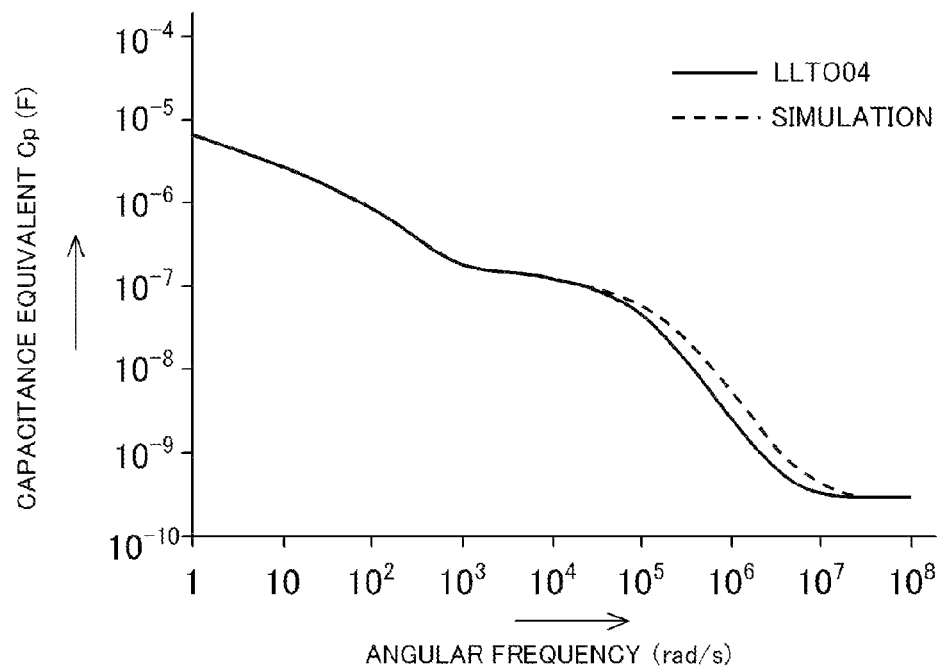
FIG. 6 is a graph indicating the result of actual measurement on LLTO04 and the result of the simulation for the case where the intragrain resistance R1 takes on a smaller value.

FIG. 6 is a graph indicating the result of actual measurement on LLTO04 and the result of the simulation for the case where the intragrain resistance R1 takes on a smaller value. The indications of the abscissa and the ordinate of FIG. 6 are identical with those shown in FIG. 3. Moreover, circuitry parameters adopted in Analysis 4 are presented in Table 4.

TABLE 4

|  | LLTO04 | Simulation |
| --- | --- | --- |
| R1 | 79 | 50 |
| C1 | $3.12 \times 10^{-10}$ | $3.12 \times 10^{-10}$ |
| P1 | 1 | 1 |
| R2 | $2.57 \times 10^{3}$ | $2.57 \times 10^{3}$ |
| C2 | $2.31 \times 10^{-7}$ | $2.31 \times 10^{-7}$ |
| P2 | 1 | 1 |
| R3 | $1.00 \times 10^{20}$ | $1.00 \times 10^{20}$ |
| C3 | $7.90 \times 10^{-6}$ | $7.90 \times 10^{-6}$ |
| P3 | 0.65 | 0.65 |

As will be understood from the graph, in LLTO04, a slight reduction in the value of the intragrain resistance R1 allows frequencies at which the effect of the intragrain capacity C1 occurs to lie in a higher frequency range.

<Analysis 5>

Moreover, it is preferable that the intragrain resistance R1, the grain-boundary resistance R2, and the grain-boundary capacity C2 satisfy the following formula (D):

$$1/\{(C2 \cdot (R1 \cdot R2)^{1/2}\} \geq 10000 \text{ rad/s} \qquad (D).$$

In this case, in addition to the value of the intragrain resistance R1 as found in the formula (C), the value of the grain-boundary resistance R2 is also reduced. This makes it possible to allow frequencies at which the effect of the intragrain capacity C1 occurs to lie in an even higher frequency range, and thereby achieve further reduction of the dependence of the capacitance on frequency at angular frequencies ranging downwardly from 10000 rad/s.

Figure 7:
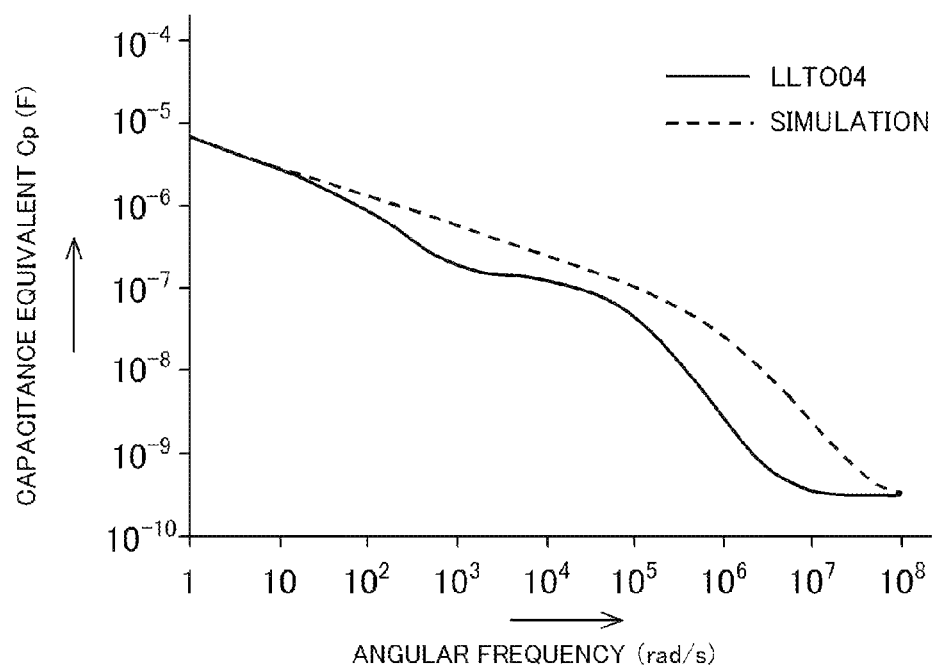
FIG. 7 is a graph indicating the result of actual measurement on LLTO04 and the result of the simulation for the case where the resistance components and the capacity components stand at predetermined appropriate values.

In running a simulation with LLTO04, the value of the intragrain resistance R1 was reduced, and, in addition to that, the grain-boundary capacity C2 and the interfacial capacity C3 were set at the same value, and also the value of the grain-boundary resistance R2 was reduced. Then, comparison was made between the result of the simulation and actual measurement data. FIG. 7 is a graph indicating the result of actual measurement on LLTO04 and the result of the simulation for the case where the resistance components and the capacity components stand at predetermined appropriate values. The indications of the abscissa and the ordinate of FIG. 7 are identical with those shown in FIG. 3. Moreover, circuitry parameters adopted in Analysis 5 are presented in Table 5.

TABLE 5

|    | LLTO04              | Simulation          |
|----|---------------------|---------------------|
| R1 | 79                  | 10                  |
| C1 | $3.1 \times 10^{-10}$ | $3.1 \times 10^{-10}$ |
| P1 | 1                   | 1                   |
| R2 | $2.6 \times 10^3$   | $1.5 \times 10^1$   |
| C2 | $2.3 \times 10^{-7}$ | $7.9 \times 10^{-6}$ |
| P2 | 1                   | 1                   |
| R3 | $1.0 \times 10^{20}$ | $1.0 \times 10^{20}$ |
| C3 | $7.9 \times 10^{-6}$ | $7.9 \times 10^{-6}$ |
| P3 | 0.65                | 0.65                |

As will be understood from the graph, in a case where the value of the intragrain resistance R1 is reduced, and the value of the grain-boundary capacity C2 is equal to or greater than the value of the interfacial capacity C3, a reduction in the value of the grain-boundary resistance R2 allows frequencies at which the effect of the intragrain capacity C1 is brought to the fore to lie in an even higher frequency range.

The intragrain resistance R1 results from, for example, scattering of ion current caused by an incommensurate crystal structure such as dislocation in crystal grains, and is augmented with an increase in discommensuration. As a general rule, by optimizing conditions to be satisfied in firing the inorganic solid electrolyte 2 having a polycrystalline structure, the density of discommensuration such as dislocation in crystal grains of the principal crystalline phase can be lowered, thus increasing the crystallinity with consequent attainment of nearly single-crystal properties. In this way, reduction of the intragrain resistance R1 can be achieved.

Moreover, in the electric double-layer capacitor 1 pursuant to the invention, the volume resistivity of the inorganic solid electrolyte 2 is preferably greater than or equal to $1 \times 10^5$ Ω·cm.

By setting the range of the volume resistivity of the inorganic solid electrolyte 2 in that way to attain higher insulation against electron conduction, it is possible to increase the capacity of the capacitor 1 operated in a low-frequency range, as well as to maintain high power storage capability in the capacitor serving as a power storage device. The volume resistivity of the inorganic solid electrolyte 2 can be determined by following a step of measuring leakage current which is caused upon application of DC voltage of 1 to 4 V between the pair of current collectors 3A and 3B that hold the inorganic solid electrolyte 2 in between, and a step of converting the measured leakage current into volume resistivity for the inorganic solid electrolyte 2.

In the inorganic solid electrolyte 2 having a polycrystalline structure, electron conduction occurs mainly via the grain boundary phase. Thus, to enhance the insulation properties of the inorganic solid electrolyte 2 against electron conduction, for example, the crystallinity of the grain boundary phase is increased to suppress electron conduction at the grain boundary phase, thus imparting higher electronic insulation to the grain boundary phase. Such a grain boundary phase can be attained by using an existing technique of designing a sintering aid and a trace additive in conformity with a principal crystalline phase to increase crystallinity of a grain boundary phase of crystallized glass ceramics, for example.

The thickness of the inorganic solid electrolyte 2 is determined so that about several to ten crystal grains exist between the pair of current collectors 3A and 3B. This design enables alkali-metal ions such as Li ions to mainly move within the crystal grains.

Although there is no particular limitation, for example, the thickness of the current collector 3A, 3B falls in the range of 0.5 to 3.0 μm. Moreover, the current collector is made of a material composed predominantly of any one of Au, Ag, and Cu, for example. The current collectors 3A and 3B are formed on opposite principal surfaces, respectively, of the inorganic solid electrolyte 2 by means of sputtering or otherwise, or alternatively, a plurality of inorganic solid electrolytes 2 and current collectors 3A and 3B are laminated on top of one another and fired together into a stacked body.

The value P3 in LLTO04 and LAGP presented in Table 1 is less than 1. Thus, a graph line representing the dependence of the capacitance of the capacitor on frequency is not flat even in a range of frequencies at which the interfacial capacity C3 alone serves, and, the developed frequency dependence is such that the capacitance is decreased by decrements corresponding to the power of P3−1. It is desirable to approximate P3 to 1 to reduce such a frequency dependence. This is achieved by obtaining a match between ion conduction in the inorganic solid electrolyte 2 and electron conduction in the current collectors 3A and 3B in the vicinity of interfaces. More specifically, in the material for constituting the current collectors 3A and 3B such as Au, Ag, or Cu, another metal material or inorganic material is added for optimization to allow the electron conductivity of the current collectors 3A and 3B in the vicinity of interfaces to match ion conduction in the inorganic solid electrolyte 2.

Hereinafter, an example of a method for manufacturing the electric double-layer capacitor 1 pursuant to the invention will be described.

In manufacturing the electric double-layer capacitor 1, first, the inorganic solid electrolyte 2 such for example as LLTO is fired, and subsequently the current collectors 3A and 3B made of a metal material such as Au, Ag, or Cu are formed on the surfaces of the fired inorganic solid electrolyte 2 with use of an ion sputtering apparatus or the like. For example, the inorganic solid electrolyte 2 can be produced by performing a step of mixing raw materials, a primary crushing step, a calcining step, a secondary crushing step (the calcining step and the crushing steps may be repeated several times on an as needed basis), a shaping step, and a firing step in the order named. Conditions to be satisfied in the production, including the calcining temperature, the number of calcining steps, and the firing temperature, are determined properly in accordance with the material used for the inorganic solid electrolyte 2. For example, in the case of LLTO, the primary calcining step is performed under conditions where calcining temperature is 800° C. and retention time is 4 hours; the secondary calcining step is performed under conditions where calcining temperature is 1150° C. and retention time is 12 hours; and the firing step is performed under conditions where firing temperature is 1250° C. and retention time is 6 hours. In this way, the inorganic solid electrolyte 2 is produced.

The following describes the production of samples for actual measurement in each analysis as above described. With use of a polycrystalline substance of LLTO having a perovskite crystal structure ($La_{(2-x)/3}Li_xTiO_3$) and a polycrystalline substance of LAGP having a NaSICON crystal structure ($Li_{\alpha(1+x)}Al_xGe_{2-x}(PO_4)_\beta$, samples of the inorganic solid electrolyte 2 were produced.

$La_2O$ powder, $Li_2CO_3$ powder, $TiO_2$ powder (rutile type), $Al_2O_3$ powder, $GeO_2$ powder, and $(NH_4)_2HPO_4$ powder that are not less than 99% pure have been mixed for preparation so as to attain the composition ratio (element ratio) presented in Table 6 for the case with LLTO, as well as to cause the following relationships to be obtained: x=0.5; α=1.0; and β=3.0 for the case with LAGP. Then, the mixtures were subjected to crushing and mixing process (primary crushing step).

After that, the thereby obtained slurry was dried by a rotary evaporator and then calcined at 800° C. (primary calcining step), as well as at 1050° C. (secondary calcining step) for the case with LLTO, or calcined at 750° C. for the case with LAGP, in the atmosphere. The calcined powder has been pulverized (secondary crushing step) so as to have a mean particle size of 0.5 to 1.2 μm. In the case of LLTO05, $BaCO_3$ in an amount of 5% by mass (in oxide (BaO) equivalent) was added to 100% by mass of LLTO04 powder that had undergone the secondary calcining step, and subsequently the powder mixture was subjected to the secondary crushing step.

A paraffin wax in an amount of 5% by mass was admixed in the powder obtained by the secondary crushing step, and the admixture was press-molded under a pressure of 1 ton/cm² by a mold press to produce a press-molded body which is 15 mm in diameter and 1.5 mm in thickness.

The press-molded body was fired in the atmosphere under conditions where the rate of temperature rise is 400° C./hour; firing temperature is 1250° C. (for LLTO) or 850° C. (for LAGP); retention time is 2 to 6 hours; and the rate of temperature decrease is 400° C./hour, thus producing a sintered body in the form of a circular plate which is 13 mm in diameter and 1.3 mm in thickness (inorganic solid electrolyte 2). Conditions to be satisfied in the production of samples of LLTO sintered body are presented in Table 6.

TABLE 6

| | Composition ratio for preparation | | | Firing conditions | | |
|---|---|---|---|---|---|---|
| | La | Li | Ti | Firing temperature [° C.] | Retention time [hour] | Rate of temperature decrease [° C./min] |
| LLTO01 | 0.500 | 0.500 | 1 | 1250 | 6 | 400 |
| LLTO04 | 0.527 | 0.420 | 1 | 1250 | 6 | 400 |
| LLTO05 | | | | | | |

(Impedance Measurement)

The front and back side of each sample has been polished to a mirror-smooth state by #500 to #3000 sandpaper and a #6000 diamond paste, so that the sample has a thickness of 800 μm. After that, a Au electrode (current collector) which is 1 cm in diameter was formed on each of the front and back side by an ion sputtering apparatus (JEOL-JFC-1500).

AC voltage of 500 mV in terms of an rms value of voltage (Bias 0V) was applied to each sample formed with the Au electrodes to measure a real part Z' and an imaginary part Z" of impedance. At this time, impedance measurement equipment manufactured by Solartron was used for frequencies ranging from 0.01 Hz to 10 MHz, and impedance measurement equipment manufactured by Agilent (Model 4294A) was used for frequencies ranging from 40 Hz to 110 MHz.

Capacitance Cp (F) was calculated on the basis of the measured real part Z' and imaginary part Z" of impedance. The capacitance Cp was calculated by utilizing the following formula: $Cp=Z''/(2\pi f(Z'^2+Z''^2))$ (wherein f represents frequency).

(Volume Resistivity Measurement)

The volume resistivity of each sample was derived by applying DC voltage to the Au electrodes of each sample in accordance with a four-terminal method, and performing conversion calculation on the basis of the detected leakage current. Each and every sample exhibited a volume resistivity of greater than or equal to $6 \times 10^5$ Ω·cm at the applied voltage of 1 to 4 V.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. An all-solid-state capacitor, comprising:
   an inorganic solid electrolyte; and
   a pair of current collectors disposed so as to hold the inorganic solid electrolyte in between,
   the inorganic solid electrolyte having a polycrystalline structure,
   the all-solid-state capacitor satisfying a relationship given as: R1<R2<R3, a relationship given as: C1<C3, and a relationship given as: C1<C2,
   in which, R1, R2 and R3 are resistance components, and R1 denotes an intragrain resistance of the inorganic solid electrolyte, R2 denotes a grain-boundary resistance of the inorganic solid electrolyte and R3 denotes an interfacial resistance between the inorganic solid electrolyte and the current collector, and,
   C1, C2 and C3 are capacitance components, and C1 denotes an intragrain capacity of the inorganic solid electrolyte, C2 denotes a grain-boundary capacity of the inorganic solid electrolyte and C3 denotes an interfacial capacity between the inorganic solid electrolyte and the current collector,
   wherein a value B which is expressed by the following formula (B) falls in a range of 0.1 to 100 rad/s:

$$B=1/(R2 \cdot C2) \quad \quad (B),$$

in which R2 denotes the grain-boundary resistance and C2 denotes the grain-boundary capacity.

2. The all-solid-state capacitor according to claim 1, wherein a value A which is expressed by the following formula (A) falls in a range of 0.1 to 100 rad/s:

$$A=1/\{R2 \cdot (C2 \cdot C3)^{1/2}\} \quad \quad (A),$$

in which R2 denotes the grain-boundary resistance, C2 denotes the grain-boundary capacity, and C3 denotes the interfacial capacity.

3. The all-solid-state capacitor according to claim 1, wherein a volume resistivity of the inorganic solid electrolyte is greater than or equal to $1\times10^5$ Ω·cm.

4. The all-solid-state capacitor according to claim 1, wherein the all-solid-state capacitor is an electric double-layer capacitor.

5. An all-solid-state capacitor, comprising:
an inorganic solid electrolyte; and
a pair of current collectors disposed so as to hold the inorganic solid electrolyte in between,
the inorganic solid electrolyte having a polycrystalline structure,
the all-solid-state capacitor satisfying a relationship given as: R1<R2 <R3, a relationship given as: C1<C3, and a relationship given as: C1<C2,
in which, R1, R2 and R3 are resistance components, and R1 denotes an intragrain resistance of the inorganic solid electrolyte, R2 denotes a grain-boundary resistance of the inorganic solid electrolyte and R3 denotes an interfacial resistance between the inorganic solid electrolyte and the current collector, and,
C1, C2 and C3 are capacitance components, and C1 denotes an intragrain capacity of the inorganic solid electrolyte, C2 denotes a grain-boundary capacity of the inorganic solid electrolyte and C3 denotes an interfacial capacity between the inorganic solid electrolyte and the current collector,
wherein a ratio C2/C3 of the grain-boundary capacity C2 to the interfacial capacity C3 is greater than or equal to 0.8.

6. An all-solid-state capacitor, comprising:
an inorganic solid electrolyte; and
a pair of current collectors disposed so as to hold the inorganic solid electrolyte in between,
the inorganic solid electrolyte having a polycrystalline structure,
the all-solid-state capacitor satisfying a relationship given as: R1<R2<R3, a relationship given as: C1<C3, and a relationship given as: C1<C2,
in which, R1, R2 and R3 are resistance components, and R1 denotes an intragrain resistance of the inorganic solid electrolyte, R2 denotes a grain-boundary resistance of the inorganic solid electrolyte and R3 denotes an interfacial resistance between the inorganic solid electrolyte and the current collector, and,
C1, C2 and C3 are capacitance components, and C1 denotes an intragrain capacity of the inorganic solid electrolyte, C2 denotes a grain-boundary capacity of the inorganic solid electrolyte and C3 denotes an interfacial capacity between the inorganic solid electrolyte and the current collector,
wherein the intragrain resistance R1 and the grain-boundary capacity C2 satisfy the following formula (C):

$$1/(R1 \cdot C2) \geq 10000 \text{ rad/s} \tag{C}$$

* * * * *